United States Patent [19]

Quackenbush et al.

[11] 4,390,944
[45] Jun. 28, 1983

[54] SYSTEM FOR CONTROLLING ACCESS TO A COMMON BUS IN A COMPUTER SYSTEM

[75] Inventors: William L. Quackenbush, Palo Alto; Stephen C. Porter, Los Gatos; William P. Cargile, Half Moon Bay, all of Calif.

[73] Assignee: BTI Computer Systems, Sunnyvale, Calif.

[21] Appl. No.: 149,485

[22] Filed: May 13, 1980

[51] Int. Cl.³ .............................................. G06F 9/46
[52] U.S. Cl. .................................................... 364/200
[58] Field of Search ................................. 364/200, 900

[56] References Cited

U.S. PATENT DOCUMENTS

| | | | |
|---|---|---|---|
| 3,993,981 | 11/1976 | Cassarino | 364/200 |
| 3,995,258 | 11/1976 | Barlow | 364/200 |
| 4,030,075 | 6/1977 | Barlow | 364/200 |
| 4,096,571 | 6/1978 | Vander Mey | 364/200 |
| 4,229,791 | 10/1980 | Levy | 364/200 |

Primary Examiner—Joseph F. Ruggiero
Assistant Examiner—Michael R. Fleming
Attorney, Agent, or Firm—Thomas H. Olson

[57] ABSTRACT

Circuitry for affording access to a common passive bus by a plurality of computer devices connected to the bus. Each of the devices is provided with the circuitry, which operates in three sequential phases: a bus request phase, an address phase and a data transfer phase. Circuitry interconnecting the bus connections for permitting a device to initiate the bus request phase only if all devices superior to it are not in the bus request phase thereby establishing a priority ranking among the devices. The circuitry also includes a call back system wherein if a given device is unready to receive data when addressed by a source device, such device will, when it is ready, call back the source device that was previously and unsuccessfully attempting to transfer data to it. The call back system is also adapted to permit a device to wait for response from a single one of the other devices until such other device responds and then to call back other devices that tried to address it while it was waiting for a response from the single device.

5 Claims, 5 Drawing Figures

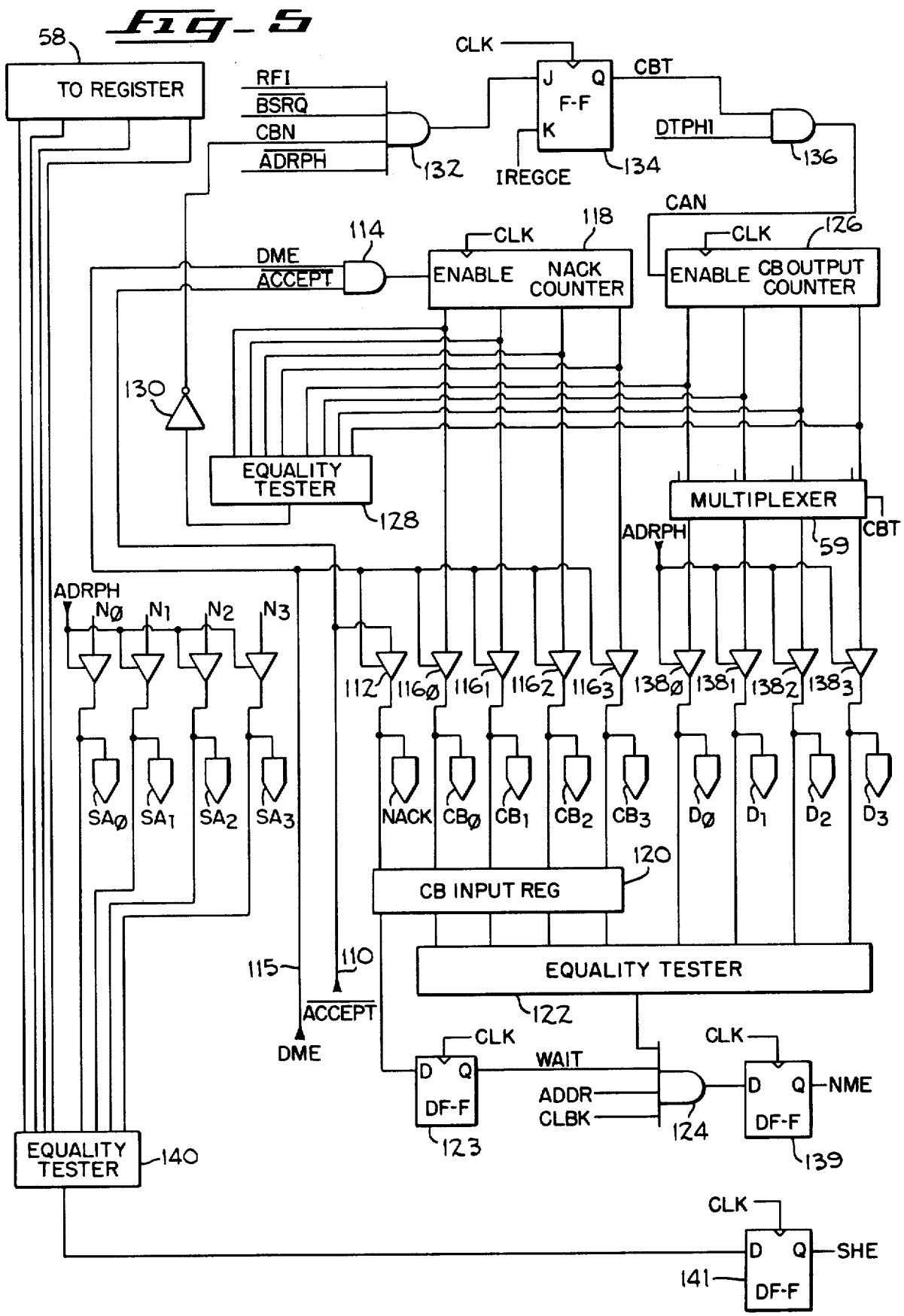

SYSTEM FOR CONTROLLING ACCESS TO A COMMON BUS IN A COMPUTER SYSTEM

BACKGROUND OF THE INVENTION

1. Field of the Invention

This invention relates to a system for controlling access to a common bus by a plurality of data handling devices in a computer system, and more particularly to a system that establishes priority of bus access among the various devices.

2. Description of the Prior Art

A typical data processor includes a central processing unit (CPU) in which arithmetic operations are performed, a memory controller unit (MCU) for controlling data to and from data storage equipment, a peripheral processing unit (PPU) for processing data to and from input/output equipment and other peripherals, and a system service unit (SSU) for monitoring power, supplying clock signals and the like to other units. The relative size and capacity of the different units vary as a function of the particular data processing operation of interest. In special purpose data processors, i.e., data processors designed to perform a limited number of specific operations, the capacity and number of the different units can be established to conform with the user's needs. In a general purpose multiprocessor, however, it is sometimes the practice to provide a common bus and to connect to the bus individual units in relative numbers dictated by the user's needs. In such system, known as a multiprocessor, improved efficiency can be realized by establishing a priority system so that a given data handling unit can obtain access to the bus before some other given data unit. A versatile priority system can permit flexible use of system resources to accommodate a variety of users' needs.

SUMMARY OF THE INVENTION

The present invention is embodied in a system that employs a synchronous bus, i.e. a bus in which transfer of data and control signals therein is achieved during predetermined time quantums. Each individual device attached to the bus has bus interface circuitry which operates to effect data input from the bus to the device or data output from the device to the bus. In the following description the time period during which various circuit functions are performed are referred to as clock periods and/or time quantums. Although typically a clock period or time quantum represents the time increment between two clock pulses produced by the system clock, it is not intended to limit the invention to such typical practice. For example, in certain cases a given procedure (e.g., the bus request phase) occurs over several successive clock periods. Additionally, a time quantum or clock period that establishes timing for the bus interface circuitry of the invention can be, but does not have to be, a multiple of the period of the system clock.

In accordance with the present invention, three individual time quantums are employed in each data transfer. During a first time quantum the logic circuitry in a device requiring access to the bus operates in a bus request phase. Access to the bus in the bus request phase is accomplished in an order of priority based on the position of the device and based on other factors described in more detail hereinafter. When a device has obtained access to the bus during the bus request phase, the bus interface circuitry to the device operates during a second time quantum in an address phase. During the address phase the interface circuitry in a recipient device, i.e. a device to which data is to be transferred, is set up so that such recipient device will receive data during a final phase. The final phase is referred to herein as a data phase and occurs in a third time quantum which follows the second time quantum. In cases where a double data word is to be transferred, the invention also provides for data transmission of a second word during a fourth time quantum which immediately succeeds the third time quantum and can be considered part of the data phase.

An object of the present invention is to provide a system for affording bus access which establishes a bus access priority system based on the physical position on the bus of a given unit or device. Interconnection between a given device and the bus is achieved by means of a series of connectors permanently connected to the bus into which can be plugged various devices. If design of a data processor dictates that a particular device, e.g. a MCU, have high priority in obtaining bus access, such device can be placed in an appropriately located connector which is interconnected with the bus to achieve such high priority. An advantage of this characteristic of the invention is that a given number of standard units or devices can be combined to form a multiprocessor which is arranged to afford optimum data flow for many different end results.

Another object of the invention is to assure expeditious data transfer between two devices connected to the bus even in situations where during the address phase the addressed recipient device is unready to receive data. This object is achieved by providing the bus interface circuitry on each device with a call back unit which stores information indicative of the fact that a source device wishes to communicate therewith and which calls back the source device when the recipient device is prepared to receive data.

Still another object of the invention is to provide bus access controlling circuitry on some but less than all devices that can establish a subsidiary priority system or queue which affords bus access based on time ranking rather than positional ranking. The device within the subsidiary queue that first seeks access to the bus will obtain access before all other devices in the subsidiary queue notwithstanding the location of such devices.

The foregoing together with other objects, features and advantages will be more apparent after referring to the following specification and the accompanying drawings.

BRIEF DESCRIPTION OF THE DRAWINGS

FIG. 5 is a block diagram showing circuitry that is active during the call back procedure.

DESCRIPTION OF THE PREFERRED EMBODIMENT

Figure 1:
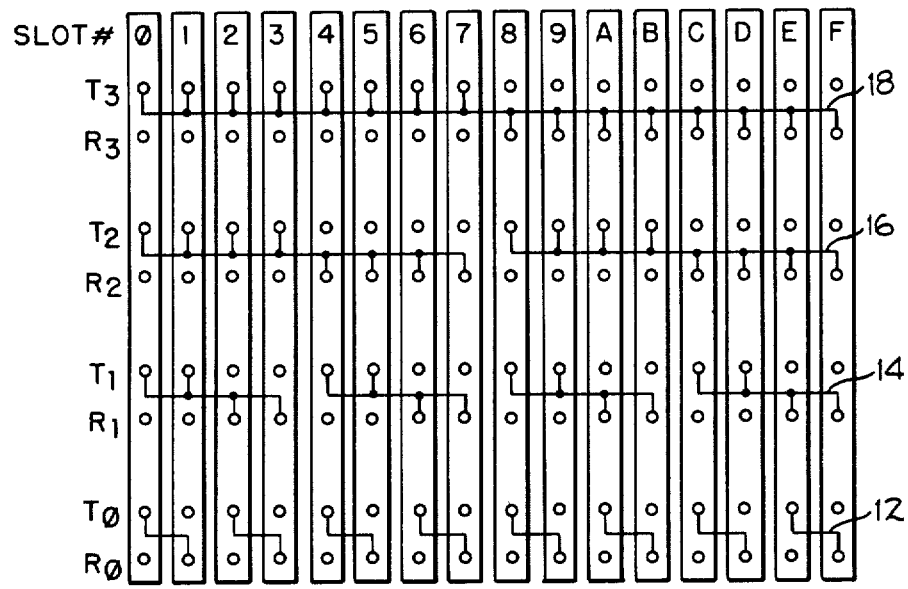
FIG. 1 is a schematic diagram of a selected number of bus interconnections that form a part of the priority system based upon physical location along the bus.

Before a detailed description of an embodiment of a system for controlling access to a single bus by a plurality of circuit devices connected to the bus, an overview of system operation will be given. Reference will be made first to the mode of operation in which a destination or recipient device to which data is to be sent is ready to receive the data at the time the source device first sends it. This mode of operation is referred to herein as a normal data transfer. Second will be described the mode of operation when the destination or recipient device is unable to accept the data because the recipient device is in communication with another device different from the source device. This mode of operation is referred to herein as a call back data transfer. In both cases a data transfer occurs in three phases, each phase being coterminous with one or more clock periods but not necessarily with successive clock periods.

In a normal data transfer a source device executes, in order, a bus request phase, an address phase and a data phase. In the bus request phase of a normal data transfer, the source device operates to exclude inferior devices from access to the bus and senses whether any superior devices control the bus. When the source device senses the absence of superior devices on the bus, such condition produces a signal which permits the source device to enter the address phase.

During the address phase, the source device connects to bus conductors a binary signal identifying the recipient device. Additionally, during the address phase the source device identifies its position on a different group of bus conductors. Finally, if the ensuing data phase is to involve a double word transfer during two successive clock periods, the source board will connect a signal to the bus to this effect so as to delay access by another device for an additional clock period.

During the data phase of a normal data transfer the source device applies to data conductors on the bus the data, which can include parity and flag bits, together with signals identifying the source device. Such data is received and accepted by the recipient device. If a single word transfer is performed the data transfer procedure is completed; if a double word transfer is performed additional data during the succeeding clock period is sent from the source device to the recipient device after which the data transfer is completed.

Operation in the above described phases involves output circuitry on one device (the source device) and input circuitry on another device (the recipient device). In the appended drawings both output and input circuitry is shown, output circuitry being generally confined to the upper part of each drawing and input circuitry being generally confined to the lower part of each drawing.

For simplicity, the description of a preferred embodiment of the system that is given hereinafter assumes the use of positive logic wherein a logical ZERO is a low signal and a logical ONE is a high signal. It is to be understood that positive logic is exemplary only, and the particular logic used in implementing the present invention depends in large part on the particular circuit components employed in the implementation.

A preferred embodiment of a system for achieving normal data transfer will now be described with reference to FIGS. 1-4. In FIG. 1 sixteen elongate rectangles labeled in hexadecimal notation as $\emptyset$-F, inclusive, represent the connectors which receive circuit boards or circuit devices for connection to the bus. The number of connectors in base 2 notation is $2^n$; in the example of FIG. 1, n=4. Each connector has a plurality of terminals which are connected to respective bus conductors. In FIG. 1, only eight terminals within each connector are shown; as will appear, each connector has many more terminals.

The eight terminals shown in each connector are divided into four (n=4) pairs. Each pair has a transmit terminal T and a receive terminal R. To differentiate the terminal pairs from one another, subscripts $\emptyset$-3 are employed.

As can be seen in FIG. 1, there are conductors in the bus for interconnecting the transmit terminals of a superior device (toward the left in FIG. 1) to the receive terminals of an inferior device (toward the right in FIG. 1). Because of the presence of n pairs of terminals in each connector, the bus interconnections are suffient to establish a rank of devices connected to the respective connectors, devices toward the left being of superior rank to devices toward the right. Having reference to the pair of terminals identified as $T_\emptyset$ and $R_\emptyset$, it will be seen that there is a bus conductor 12 interconnecting the $T_\emptyset$ terminal of connector $\emptyset$ to the $R_\emptyset$ terminal of connector 1. Each pair of adjacent connectors has similar interconnections between the $T_\emptyset$ terminal of a superior connector and a $R_\emptyset$ terminal of an inferior connector.

Terminal pairs $T_1$ and $R_1$ have bus interconnections that interconnect four adjacent connectors. Thus, there is a bus interconnection that connects terminals $T_1$ of connectors $\emptyset$ and 1 with one another and with the $R_1$ terminal of connectors 2 and 3. Similar interconnections are provided for each additional group of four connectors.

A bus interconnection 16 connects the $T_2$ terminals of connectors $\emptyset$-3 with one another and with the $R_2$ terminals of connectors 4-7. A similar conductor interconnects the $T_2$ terminals of connectors 8-B with one another and with the $R_2$ terminals of connectors C-F.

Finally, there is a bus interconnection 18 which interconnects the $T_3$, terminals of connectors $\emptyset$-7 with one another and with the $R_3$ terminals of connectors 8-F. The interconnections 12-18 shown in FIG. 1 function to rank the connectors in the order shown because when a signal is applied to all T terminals of any superior device at least one of the R terminals of any inferior device will have such signal thereon. A portion of the circuitry on each one of the boards or devices connected to connectors $\emptyset$-F for cooperating with the interconnections depicted in FIG. 1 is shown in FIG. 2.

Figure 2:
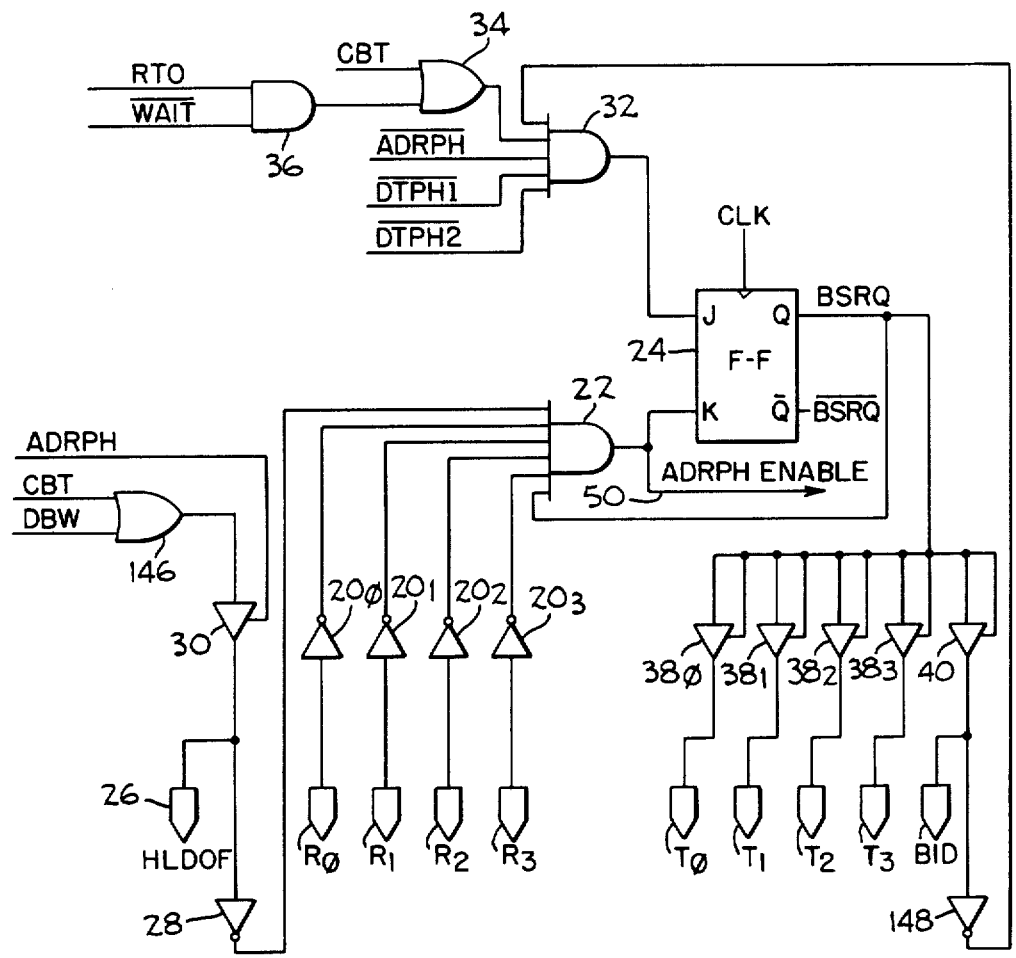
FIG. 2 is a block diagram of a portion of the circuitry present on each device which cooperates with the bus connections of FIG. 1 for affording bus access based on physical position of a device.

The portion of the bus interface circuitry shown in FIG. 2 is active when a device on which such circuit is mounted operates in the bus request phase. The circuitry includes pins $T_\emptyset$-$T_3$ which interconnect with similarly designated terminals in the connectors and interconnections 12-18 shown in FIG. 1. Each of the R pins is connected through an inverter $2\emptyset_\emptyset$, $2\emptyset_1$, $2\emptyset_2$ and $2\emptyset_3$, respectively, to the input of an AND gate 22. The output of AND gate 22 is connected to the K input of a JK flip flop 24. It will be noted that the Q output of the flip flop also constitutes an input to AND gate 22. Another input to AND gate 22 is applied from a bus connection HLDOF, an abbreviation for "hold off," such pin being shown at 26. An inverter 28 inverts the HLDOF signal before application to AND gate 22. The HLDOF signal is formed by the output of an AND gate 30. The inputs to AND gate 30 are described subsequently, it being sufficient for present purposes to assume that the output of the AND gate is low so that the output of inverter 28 is high.

The J input of flip flop 24 is connected to the output of an AND gate 32. One of the inputs to AND gate 32 is constituted by an OR gate 34, and one of the inputs to the OR gate is constituted by the output of an AND gate 36 having two inputs RTO and $\overline{\text{WAIT}}$. For the present discussion, it can be assumed that all inputs to AND gate 36 except RTO are high; further description concerning the other signals applied to AND gate 32 will be given subsequently.

The Q output of flip flop 24 is connected to bus drivers $38_0$, $38_1$, $38_2$ and $38_3$ which drive respective T pins, $T_0$-$T_3$, in response to the presence of a high state at the Q output of flip flop 24. Also connected to the Q output of flip flop 24 can be a bus driver 40 which produces a BID signal on a BID pin so labeled in FIG. 2. Further description of the BID pin and its function is deferred for the present, it being sufficient for the present to assume the BID signal is initially low so that an inverter 41 produces a logical high input to AND gate 32.

Before explaining the operation of the circuit in FIG. 2 and its cooperation with the bus interconnection arrangement of FIG. 1, it should be appreciated that each device engaged with connectors $\emptyset$-F has circuitry that corresponds substantially to that shown in FIG. 2. Thus, if a signal is produced in the T connectors of a superior device through the T pins shown in FIG. 2, such will be detected by one or more of the R pins in an inferior device.

If a given device equipped with the circuitry of FIG. 2 wishes to obtain access to the bus, a signal RTO is produced by circuitry within the device which constitutes no part of the invention and is therefore not described in detail. On the assumption that all other inputs to AND gate 32 are in a high state, the presence of signal RTO will produce a high state at the output of AND gate 32 and at the J input of flip flop 24 so that on occurrence of the next clock pulse at the flip flop, the Q output will enable bus drivers $38_0$-$38_3$. If at the same time no device engaged with a superior connector applies such signals to its T pins, then the receive pins $R_0$-$R_3$ of the device under discussion will all detect ZEROs so as to drive the output of AND gate 22 to a high state. Such output, which appears on a signal path 50 and is labeled ADRPH ENABLE, indicates that the bus request phase has been completed and the device on which the circuitry is mounted is ready to enter the address phase. It will also be noted that the output of AND gate 22 is connected to the K input of flip flop 24 so that the next clock pulse applied to the input will reset the flip flop and will disable bus drivers $38_0$-$38_3$. If one of the R pins has a logic high signal because a superior device has addressed the bus, the output of AND gate 22 will not go high until such superior device ceases to produce a signal on the T pins thereof.

Figure 3:
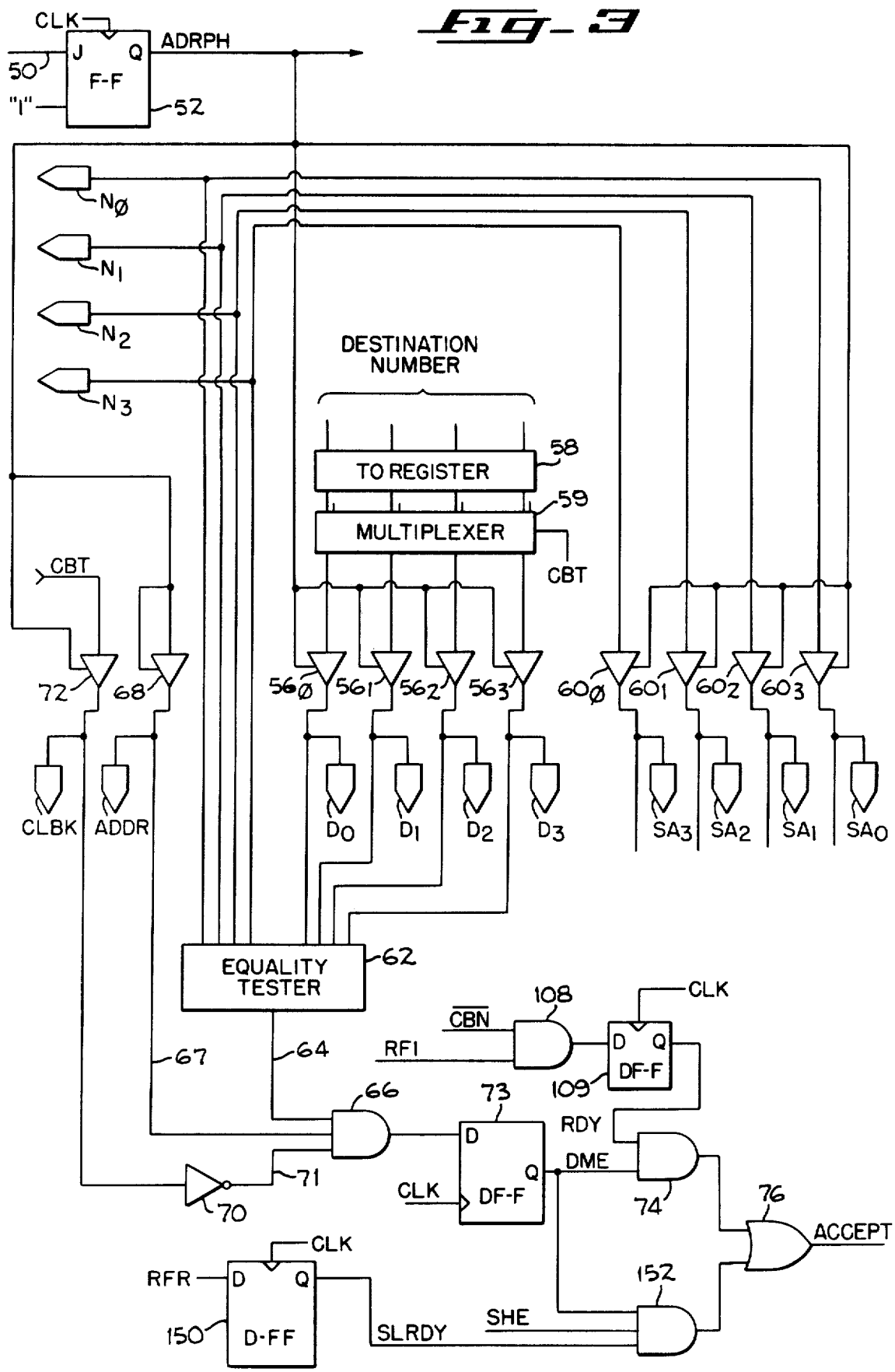
FIG. 3 is a block diagram showing circuitry that is active during the address phase.

In the address phase, the circuitry shown in FIG. 3 is active. It will be noted in the upper left hand corner of FIG. 3 that the ADRPH ENABLE signal generated by the circuitry of FIG. 2 on signal path 50 is connected to the J input of the JK flip flop 52. The Q output of flip flop 52 is identified as ADRPH, because when such output is in an active state, the circuit operates in the address phase. ADRPH is connected to one input of each of a plurality of bus drivers $56_0$, $56_1$, $56_2$ and $56_3$, the outputs of which are respectively connected to destination pins $D_0$-$D_3$ on the bus. The other inputs to bus drivers $56_0$-$56_3$ are supplied from a "TO" register 58 which previously has been loaded with the address of a destination or recipient device from circuitry on the device which forms no part of the invention and is therefore not shown or described. The connection between the outputs of TO register 58 and bus drivers $56_0$-$56_3$ includes multiplexer 59 which has two sets of inputs, one of which is connected to the TO register. A control signal CBT applied to multiplexer 59 causes establishment of the circuit condition shown in FIG. 3 when signal CBT is in a low state; a different condition will be described subsequently with reference to FIG. 5 when signal CBT is in a high state or is asserted. When ADRPH is produced at the Q output of flip flop 52, the number stored in register 58 is enabled onto the bus through multiplexer 59 and bus drivers 56 and destination pins $D_0$-$D_3$.

The device of which the circuitry of FIG. 3 is a part also has a plurality of pins $N_0$-$N_3$ which connect with permanently wired terminals in the connector with which the device is engaged; the permanently wired terminals in each connector identify the hexadecimal number or rank of the connector and therefore the number or rank of the device engaged with the connector.

During the address phase, the number of rank of a given device is employed for two purposes. The first is when a device functions as a source device; the number of the source device is enabled from pins $N_0$-$N_3$ onto source address pins $SA_0$-$SA_3$. To achieve such mode of operation, each of the pins $N_0$-$N_3$ is connected to one input of a respective bus driver $60_0$, $60_1$, $60_2$ and $60_3$. The other inputs to the bus drivers are connected to the Q output of flip flop 52 so that when the Q output is high and produces ADRPH, the number of the source device is enabled onto source address pins $SA_0$-$SA_3$. The second purpose of the device number established by pins $N_0$-$N_3$ is to establish one and only one device as a destination or recipient device. This purpose is accomplished by connecting pins $N_0$-$N_3$ to one set of inputs of an equality tester 62. To the other set of inputs of the equality tester are connected destination pins $D_0$-$D_3$; the equality tester produces an output only when the number on pins $N_0$-$N_3$ of a recipient device is equal to the number applied to pins $D_0$-$D_3$ by a source device. Such equality is manifested at the output 64 of the equality tester, which is connected as one input of a three input AND gate 66.

A second input to AND gate 66 is from an address pin ADDR on a circuit path 67. A signal is supplied to the address pin in response to production of signal ADRPH on the Q output of flip flop 52 applied to a bus driver 68.

The final input to AND gate 66 is formed by the absence of a signal on a call back pin CLBK which is connected through an inverter 70 and a circuit path 71 to the AND gate input. A CLBK signal is applied to the CLBK pin and the bus conductor associated therewith by a bus driver 72. The function of the call back signal will be described in more detail hereinbelow, it being sufficient for present purposes to appreciate that the absence of a signal on the call back pin CLBK causes the output of inverter 70 to go high and therefore to enable AND gate 66. The output of AND gate 66 is connected to the data input of a D flip flop 73. Flip flop 73 has a Q output which produces a signal DME ("destination me") which when in a high state indicates that the device in which it occurs is being addressed by another device.

The Q output of flip flop 73 is connected to one input of an AND gate 74, the other input of which is connected to a ready signal RDY. Further description of the generation of signal RDY is deferred; for the present it is sufficient that signal RDY is high when the device is prepared to accept data from any other device on the bus. The output of AND gate 74 is connected as an input to an OR gate 76, the output of which is a signal referred to as ACCEPT. OR gate 76 has another input which is described in a subsequent part of this specification. When the ACCEPT signal is asserted, it indicates that the device is ready to accept data from a source device. It will be appreciated that only one device connected to the bus can generate an ACCEPT signal at a given time because only one device can produce a signal DME at any given time.

The operation of the circuit of FIG. 3 in the address phase will be explained by assuming that a given source device has obtained access to the bus during the bus request phase (i.e., during a preceding time quantum) as manifested by a ADRPH ENABLE signal on path 50. Thus the next clock pulse applied to flip flop 52 causes the Q output of the flip flop to be set high so as to produce ADRPH. ADRPH enables bus drivers $56_0$–$56_3$ so that the number of the destination or recipient device is supplied from register 58 through multiplexer 59 to destination pins $D_0$–$D_3$ on the bus. Such number is sensed by the recipient device and applied to equality tester 62 therein. Upon sensing of equality between the connector numer on the recipient device and the number appearing on pins $D_0$–$D_3$, equality tester 62 enables AND gate 66, which produces a high signal at the D input of flip flop 72. Consequently, during the next succeeding clock pulse period (i.e., during the data phase), the Q output of the flip flop goes high to produce DME. Thus, if the recipient device is otherwise ready for data, as indicated by a high state in signal RDY, AND gate 74 through OR gate 76 produces an output ACCEPT so that when data is transmitted over the bus, the recipient device will accept it. A description of operation of the bus interface circuitry during the data transfer phase is given next in connection with FIG. 4.

Figure 4:
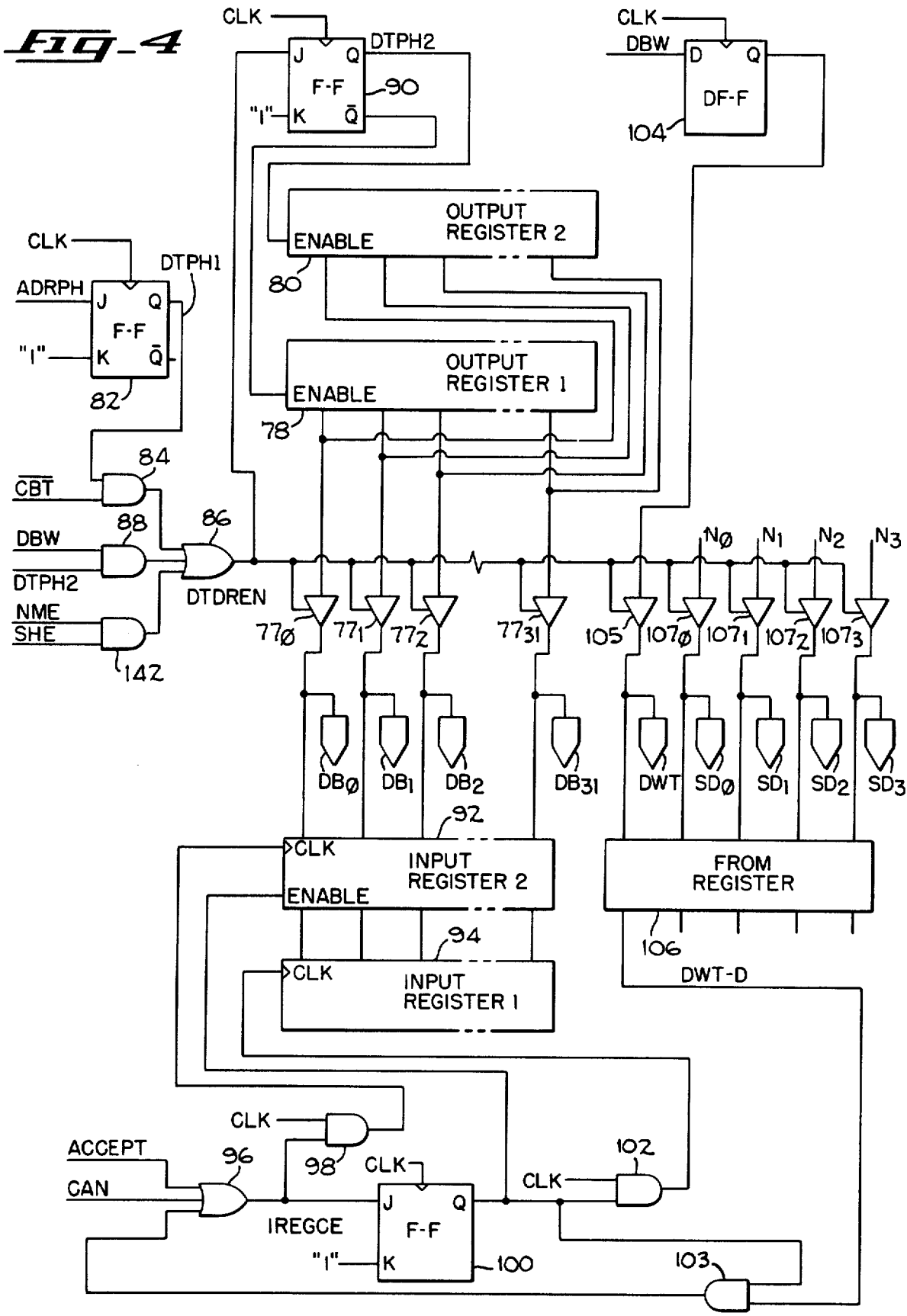
FIG. 4 is a block diagram showing circuitry that is active during the data phase.

In FIG. 4 there are data bus pins identified at $DB_0$, $DB_1$, $DB_2$ and $DB_{31}$. In a typical system embodying the invention, a data word is composed of 32 bits which are transmitted on 32 individual bus conductors; for simplicity only four data bus pins associated with such conductors are shown. The data from a source device is enabled onto the data bus pins by bus drivers $77_0$, $77_1$, $77_2$ and $77_{31}$. Bus drivers $77_0$–$77_{31}$ are enabled by a signal identified as DTDREN, an abbreviation for "data driver enable." At the outset of a data transfer sequence the source device loads one data word into a first output register 78 and another data word, in the case two data words are to be transferred, into a second output register 80.

During the data phase a source device enables output register 78 onto the DB pins through drivers $77_0$–$77_{31}$, and in the case of a double word transfer, enables output register 80 onto the same pins during the next succeeding time quantum or clock cycle. For achieving such mode of operation when a device on the bus operates as a source device, there is a JK flip flop 82 to the J input of which is connected the ADRPH signal from flip flop 52 shown in FIG. 3. The Q output of flip flop 82 produces a signal DTPH1, an abbreviation for "data phase one," which is connected to one input of an AND gate 84. To the other input of AND gate 84 is connected a signal $\overline{CBT}$ (not call back transfer) which is assumed for present purposes to be in a high state so that a signal of the same state is applied to the input of an OR gate 86. The output of OR gate 86 produces the DTDREN signal previously noted. OR gate 86 has additional inputs, but the description of such inputs is deferred for the present. Thus, in the normal data transfer mode of operation, the generation of an ADRPH signal during the address phase will cause the source device to apply data to the DB pins and their associated bus conductors during the next time quantum or clock period.

During the time quantum or clock period immediately succeeding the enabling of output register 78 onto the data bus pins $DB_0$–$DB_{31}$, flip flop 82 resets because signal ADRPH is no longer high and because the K input of the flip flop is permanently connected to a binary ONE. If only a single word transfer was initiated by the source board, the data transferred during the normal mode of operation is complete because signal DTDREN is not produced during the succeeding time quantum. If, however, the data transfer is a double word transfer, both inputs of an AND gate 88 in the source device are set high. These inputs are DBW ("double word") and DTPH2 ("data phase 2"). The signal DBW is produced by circuitry in the source device not part of the present invention. Such signal is applied directly to one of the inputs of AND gate 88. The other input to AND gate 88 is a signal identified in FIG. 4 as DTPH2. The latter signal is produced at the Q output of a flip flop 90. During the first data phase the signal DTDREN is applied to the J input of flip flop 90 so that during the next succeeding clock period the Q output of the flip flop goes high to produce DTPH2. As will appear below, the signal DBW is employed to produce a bus signal DWT for indicating to the recipient device that a double word transfer is in progress. Thus in the case of a double word transfer, during the time quantum following the first time quantum of the data phase, signal DTDREN is produced so as to enable data driver $77_0$–$77_{31}$. The contents of output register 80 are enabled by the $\overline{Q}$ output of flip flop 90 through the DB pins onto the bus.

The input circuitry on the recipient device that is active during the data phase is also shown in FIG. 4. Such circuit includes an input register 92 which has parallel inputs that are connected through the DB pins to the data bus conductors. The parallel outputs of register 92 are connected to the parallel inputs of an input register 94. Input registers 92 and 94 are controlled by circuitry which includes an OR gate 96, an AND gate 98, a JK flip flop 100 and an AND gate 102. There is also an AND gate 103 which is active in the case of a double word transfer. OR gate 96 has three inputs. One is the ACCEPT signal produced at the output of OR gate 76 in FIG. 3. The second input, identified as CAN in FIG. 4, is not used in a regular data transfer and will be described subsequently. The final input is from AND gate 103 and is high during the second word of a double word transfer. The output of OR gate 96 is identified as IREGCE, an abbreviation for "input register clock enable," and is connected to one input of AND gate 98 and to the J input of flip flop 100. The other input of AND gate 98 is connected to the system clock. The output of AND gate 98 is connected to the clock input of input register 92; when IREGCE is asserted, the system clock is enabled to the clock input of the input register, thus clocking the data on pins $DB_0$-$DB_{31}$ into the input register 92.

Flip flop 100 has a Q output connected to the enable terminal of input register 92. When a signal is applied to the enable terminal of the input register, the data contained in the input register is transferred to the output thereof, such output being connected to the input of input register 94. The Q output of flip flop 100 is connected to one input of AND gate 102, to the other input of which is connected the system clock. The output of AND gate 102 is connected to the clock terminal of input register 94. When the Q output of flip flop 100 is asserted, the system clock is enabled to the clock terminal of the input register, thus clocking the data into the input register 94.

The operation of the circuit of FIG. 4 during a single word data transfer will be explained. When the source device is in the address phase as described above in connection with FIG. 3, the signal ADRPH is produced at the output of flip flop 52 (see FIG. 3) and supplied to the input of flip flop 82 (see FIG. 4). Accordingly, at the next clock pulse the Q output of flip flop 82 is set high to produce DTPH1. Such signal through AND gate 84 and OR gate 86 produces the signal DTDREN which enables bus drivers $77_0$-$77_1$ so that the data in output register 78 is applied to pins $DB_0$-$DB_{31}$ and to the bus conductors associated with such pins. During the same clock period, the recipient board receives such data into input register 92 because signal ACCEPT and the system clock coincide at the input of AND gate 98 to clock the input register. During the succeeding clock period, the data is enabled onto the outputs of input register 92 because the $\bar{Q}$ output of flip flop 100 is high at that time. During the succeeding clock period, the Q output of flip flop 100 goes high, the output of AND gate 102 goes high and the data at the output of input register 92 is clocked to the input of input register 94 from which it is taken by other parts of the circuitry, not shown.

When the source device is signalled by its internal circuitry to make a double word transfer, a signal DBW is produced therein. Signal DBW is applied to the D input of a flip flop 104 during the time quantum of the address phase. The Q output of flip flop 104 is connected to one input of a bus driver 105 which is enabled by the signal DTDREN onto the pin DWT and a bus conductor associated therewith during the time quantum of the first word of the data phase. The input circuitry active on the recipient device includes a FROM register 106, one of the inputs of which is connected to the DWT pin. During the next succeeding time quantum register 106 produces a signal DWT-D ("double word transfer delayed") which is applied to one of the inputs of AND gate 103. FROM register 106 also has inputs connected to pins $SD_0$-$SD_3$ which contain the identification of the source device during data transfer. The source device supplied its number onto the SD pins through bus drivers $107_0$-$107_3$. Bus drivers 107 enable the source device's slot number from its N pins, $N_0$-$N_3$, in response to presence of the signal DTDREN. In the input circuitry of the recipient device the output of AND gate 103 is connected to one of the inputs of OR gate 96 so that the output of the OR gate remains high for an additional clock period even though the signal ACCEPT is not present at the OR gate input during such clock period.

In the case of a double word transfer the DWT input to FROM register 106 is high in the time quantum during which the first data word is transferred. Accordingly, at the next clock pulse signal DWT-D applied through AND gate 103 to the input of OR gate 96 causes the output of the OR gate to go high so as to enable the system clock through AND gate 98 to clock the second data word into the parallel inputs of input register 92. Concurrently, the first data word is also transferred into input register 94 and the double word data transfer is complete. It will be appreciated that if flip flop 104 of the source device does not produce a signal on the DWT pin, the data phase is complete after transfer of the first data word because during the clock period following transfer of the first data word none of the inputs to OR gate 96 is high.

Thus, it is seen that during a normal data transfer, the source device substantially controls all three phases: the bus request phase (see FIG. 2), the address phase (see FIG. 3), and the data phase (see FIG. 4). As has been indicated previously, transfer of data during the data phase occurs only if an ACCEPT signal is produced in the recipient device. If the recipient device is unready for data from a source device that addresses it, ACCEPT does not appear at the input of OR gate 96 (see FIG. 4) in consequence of which input register 92 of the prospective recipient device does not accept the data on pins $DB_0$-$DB_{31}$. It will be noted in FIG. 3 that the inputs to AND gate 74 include the signal DME and the signal RDY. The signal DME is produced in the recipient device during the data phase even if the recipient device is not ready for data, so long as the recipient device was addressed during the address phase. The signal RDY is generated by an AND gate 108, the output of which in the previous discussion was assumed to be high, and a D flip flop 109, which has its D input coupled to the output of AND gate 108 and which at its Q output produces RDY during the data phase. The output of AND gate 108 will not be high, however, if either of its inputs is not high. When the recipient device is not ready for data, the AND gate input RFI ("ready for input") will not be high so that execution of the address phase does not result in generation of ACCEPT in the prospective recipient device during the data phase. The signal RFI is produced by other circuitry (not shown) included on each device; the circuitry functions to produce RFI only when the device is ready for input. The consequence of absence of RFI during the address phase will now be explained in reference to FIG. 5.

A signal $\overline{ACCEPT}$ is produced in the prospective recipient device and is connected on a circuit path 110 (see FIG. 5). Circuit path 110 is connected to one input of a bus driver 112, the output of which is connected to a pin NACK ("not acknowledged") and a bus conductor associated therewith. Circuit path 110 is also connected as one input to an AND gate 114. The signal DME produced at the Q output of data flip flop 73 (see FIG. 3) is connected via a circuit path 115 to the other input of bus driver 112 and to the other input of AND gate 114. Additionally, the signal DME is connected to one input terminal of bus drivers $116_0$-$116_3$; such bus drivers drive CB (call back) pins and their associated bus conductors, such pins being identified as $CB_0$-$CB_3$ respectively. The other inputs to bus drivers $116_0$-$116_3$ are connected to respective parallel outputs of a counter 118 which is referred to hereinafter as a NACK counter. NACK counter 118 provides a call back number to a source device when the prospective recipient device that is addressed by such source device is unready for data transfer from the source device; the call back number is stored by the source device so that when the recipient device subsequently becomes ready for data from the source device, it can identify such source device. Because the embodiment being discussed herein has sixteen connectors for sixteen individual devices, NACK counter 118 has four outputs.

To recapitulate the events that occur when a prospective recipient device is unready to accept data from a source device that addresses it, the signals DME and $\overline{ACCEPT}$ will be simultaneously produced in the prospective recipient device. This produces a signal on the NACK pin through bus driver 112 and produces a call back number from NACK counter 118 through bus drivers $116_0$–$116_3$ to call back pins $CB_0$–$CB_3$. Because AND gate 114 is high, the next clock pulse applied to NACK counter 118 causes the number produced by the NACK counter to change by one count. The response of the source device to the foregoing will now be explained.

As can be seen in FIG. 5, each device has a call back input register 120 which has inputs connected to the NACK pin and call back pins $CB_0$–$CB_3$. Input register 120 has parallel inputs and outputs so that the call back number sent from NACK counter 118 of a prospective recipient device over pins $CB_0$–$CB_3$ is received by the call back register and applied to one set of inputs to an equality tester 122 in the source device.

The signal from the NACK pin is connected through input register 120 to the input of a D type flip flop 123, the Q output of which produces a WAIT signal on the next succeeding clock pulse. The WAIT signal is connected as one input of an AND gate 124. The source board is thus rendered temporarily inactive until the prospective recipient board subsequently manifests that it is ready to receive data. As will appear in more detail hereinbelow, a given prospective recipient device forms a queue of source devices and serves those devices in the queue in the order that they attempted to transmit data to the prospective recipient device.

In each device connected to the bus there is a call back output counter 126 which is used to call back source devices in the above mentioned queue. When a recipient device is ready for input of data from a source board in the queue the count produced by call back output counter 126 in the recipient device and the count stored in input register 120 of a source device are equal. Within a recipient device the condition that there is one or more source devices that are to be called back is manifested by inequality of the outputs of NACk counter 118 and call back output counter 126. The outputs of such counters are connected to an equality tester 128 which produces a high output when the counter outputs are equal and a low output when the counter outputs are unequal. The output of equality tester 128 is connected through an inverter 130 so that a high output at inverter 130 signifies inequality between the outputs of NACK counter 118 and call back output counter 136, such signal being referred to as "call back needed" and abbreviated as CBN. The signal CBN is connected to one input of an AND gate 132. Circuitry on the device, which is not part of the present invention, produces signal RFI ("ready for input") when such circuitry is ready for input. Signal RFI is connected as another input of AND gate 132 as are signals $\overline{BSRQ}$ and $\overline{ADRPH}$. Accordingly, when a prospective recipient device is ready for input, ready to initiate a call back and is not operating in the bus request phase or the address phase, the output of AND gate 132 goes high. Such output is connected to the J input of a JK flip flop 134, the Q output of which produces a signal CBT, an abbreviation for "call back transfer." Signal CBT is connected as one input to an AND gate 136. To the other input of AND gate 136 the signal DTPH1 from flip flop 82 (see FIG. 4) is connected. The output of AND gate 136 is connected to the enable input of call back output counter 126 so that when the output of AND gate 136 goes high, the number produced by the call back output counter will change by one. Such number will be enabled onto destination pins $D_0$–$D_3$ from the prospective recipient board during the address phase of a subsequent call back transfer. The call back number from the output of counter 126 is connected to destination pins $D_0$–$D_3$ through multiplexer 59 and bus drivers $138_0$–$138_3$. Because CBT is high, multiplexer 59 connects counter 126 to bus drivers $138_0$–$138_3$ during the address phase of the call back process.

Referring now to FIG. 2, it will be noted that OR gate 34 has as one of its inputs the signal CBT produced by flip flop 134 of FIG. 5. Through the output of OR gate 34, AND gate 32 is enabled in response to coincidence of CBT, $\overline{ADRPH}$, $\overline{DTPH1}$ and $\overline{DTPH2}$. Operation following the enabling of gate 32 proceeds as described previously whereby the prospective recipient device that is initiating a call back obtains access to the bus during the bus request phase. The prospective recipient board also performs the address phase during the call back process. As described previously in connection with FIG. 3, the Q output of flip flop 52 produces a signal ADRPH during the address phase. This signal (see FIG. 5) enables a plurality of bus drivers $138_0$–$138_3$ so that the call back number produced by call back output counter 126 is enabled onto such pins. Thus, the source device which has previously stored the same number in its call back input register 120 will detect equality between the number on destination pins $D_0$–$D_3$ and the number in the call back input register. Such equality will be sensed by equality tester 122 and the output of AND gate 124 will go high. The output of AND gate 124 is connected to the D input of a D flip flop 139; during the next succeeding time quantum, the Q output of flip flop 139 goes high to produce a signal NME, an abbreviation for "number is me." Also during the address phase the prospective recipient board sends its position number on source address pins $SA_0$–$SA_3$. The same number was introduced into the TO register 58 (see FIG. 3) when the source device initially attempted to transfer data to the prospective recipient device. The output of the TO register 58 of the source device and the signals appearing on pins $SA_0$–$SA_3$ are coupled to an equality tester 140 and when equality exists an output signal is produced; such output signal is coupled to the D input of a D flip flop 141. During the next succeeding time quantum, the Q output of flip flop 141 goes high to produce a signal SHE, an abbreviation for "source he."

Concurrence of signals NME and SHE in the source device concludes the address phase and initiates the data phase. Referring to FIG. 4, there is an AND gate 142 to the inputs of which the signals NME and SHE are connected. The output of AND gate 142 is connected to the input of OR gate 86 so that initiation of the data phase occurs in the same manner as when the output of AND gate 84 is asserted, as described previously in connection with FIG. 4. At the lower portion of FIG. 4 it will be noted that one of the inputs to OR gate 96 is signal CAN so that the recipient device accepts the data sent on pins $DB_0$–$DB_{31}$ even though the ACCEPT signal to the OR gate is not high.

Because the recipient device initiated the address phase and produced a signal ADRPH, it will on the succeeding clock pulse generate the signal DTPH1 from flip flop 82 (see FIG. 4). The latter signal is ANDed with a signal CBT and AND gate 136 (see FIG. 5) so that during the data phase one a signal CAN, an abbreviation for "cancel a call back number," is produced. Such signal changes the count produced by call back output counter 126 by one number and also enables the input logic of the recipient device because the signal CAN constitutes one input to OR gate 96 (see FIG. 4).

When circuitry not shown asserts RFI, the recipient device (see FIG. 5) will initiate another call back transfer unless equality tester 128 senses equality between the outputs of counters 118 and 126. Thus, it will be appreciated that the circuitry shown in FIG. 5 and described above enables a recipient device to sequentially receive data from a plurality of source devices, even if the source devices attempt to address the recipient device at a time when the recipient device is unready for the data. It should be realized, however, that the priority system described in connection with FIGS. 1 and 2 will supersede call back because the call back procedure entails a bus request phase (see FIG. 2).

When a prospective recipient device is calling back a source board in accordance with the above described procedure, there is no indication accessible to the recipient device that is initiating the call back whether the source board will send a single word or a double word. Accordingly, all call backs are treated as double word transfers, even though only a single word is transferred during the subsequent data phase. Referring to FIG. 2, it will be seen that one of the inputs to AND gate 30 is constituted by an OR gate 146. One of the inputs of OR gate 146 is the signal CBT ("call back transfer") so that when a destination device initiates the bus request phase during a call back, the hold off pin 26 is asserted, thus excluding any other device requesting access to the bus for an additional clock period. This mode of operation tends to simplify the bus interface circuitry and reduces the number of bus conductors required.

Operation of the system in the case where a recipient device is unready for data at the time a source device originally transmits the data will be recapitulated. When the source device is unready for data during a data phase initiated by a source device, the signals $\overline{ACCEPT}$ and DME coincide in the recipient device. This places a high signal on the NACK pin which, as previously indicated, is sensed by the source device and results in production of a WAIT signal at the output of flip flop 123 in the source device. Simultaneous with the foregoing, a call back number is transmitted from the NACK counter 118 of the prospective recipient device to the source device and is stored in the call back input register 120 of the latter device. After occurrence of the foregoing, the count in NACK counter 118 in the prospective recipient device is changed by one so that if some different source device attempts to communicate with the prospective recipient device before it is ready to accept data, such other source device is given a different call back number. When the prospective recipient device is ready for data it initiates the call back procedure in response to coincidence of the signals RFI, $\overline{BSRQ}$, $\overline{ADRPH}$ and CBN at the inputs of AND gate 132. This causes flip flop 134 to produce CBT during the next time quantum. Signal CBT (see FIG. 2) causes the calling back device to execute the bus request phase and, in sequence, the address phase. During the address phase, the number in call back output counter 126 is sent through multiplexer 59 and bus drivers $138_0$–$138_3$ to destination pins $D_0$–$D_3$. The device on the bus that detects equality between the number on the destination pins and the number stored in its call back input register 120 produces a signal at the output of equality tester 122 in such device so that the output of AND gate 124 goes high. On the next clock period flip flop 139 will thus produce NME. In addition, before the source device originally addressed the recipient device that was temporarily unready for data, the source device stored the address of the recipient device in its TO register 58. During call back the recipient device transmits its slot number on source address pins $SA_0$–$SA_3$ so that equality is detected in equality tester 140 in the source device. In consequence of such equality flip flop 141 is set to produce the signal SHE during the clock period following the address phase. Referring now to FIG. 4, it will be seen that coincidence of the signals NME and SHE at the input of AND gate 142 produces through OR gate 86 the signal DTDREN so that the source device again enables the data onto data pins $DB_0$–$DB_{31}$. The destination device accepts this data because the signal CAN applied to the input of OR gate 96 in the input circuitry of the destination board is active to enable the input registers of the destination device. When this call back process has been completed and circuitry not shown sets RFI, the recipient device will initiate another call back so long as the output of equality tester 128 is low. On the next call back a different number will be applied to the destination pins $D_0$–$D_3$ from call back output counter 126 because coincidence of CBT and DTPH1 during the previous call back procedure changed the number produced by the counter. The call back procedure thus continues until equality is detected by equality tester 128 after which the recipient device is ready for input from any other device on the bus during a normal data transfer.

The bus interface logic of the present invention provides circuitry for optionally establishing a group of devices on the bus (less than all the devices) into a subsidiary or auxillary queue. In this connection, reference is made to the bid pin seen in FIG. 2. Only devices in the auxillary queue are connected to the bid pin so that during the bus request phase a device equipped with a bid pin cannot enter the bus request phase if another device having a bid pin is in the bus request phase irrespective of the relative position or rank of the two devices. That such is the case can be discerned from FIG. 2, wherein it is seen that a high signal on the bid pin will produce through inverter 148 a low signal at the input of AND gate 32. Accordingly, the devices connected to the bus which have a bid pin thereon (which are typically less than all devices) form a subsidiary queue based on time rather than being based on position or rank.

A final mode of operation to which the bus interface system of the present invention efficiently lends itself will be described in connection with FIG. 3. In certain cases it is desirable for a source device to send data over the bus to a recipient device, which data includes some specific instruction, and to wait for the recipient device to execute the instruction and respond to the source device. While waiting for a response the source device is not available for communication with any other device on the bus. When a given source device is to operate in this mode, circuitry within that device, which is not part of the present invention and is therefore not disclosed in detail, sets a signal RFR which as can be seen in FIG. 3 is applied to the J input of a flip flop 150. The Q output of flip flop 150 is identified as SLRDY, an abbreviation for "selective ready." The latter signal is connected as one input of an AND gate 152. AND gate 152 also has the input SHE and the input DME.

The operation of the bus interface circuitry in this mode of operation commences when a source device wishes to send data to a recipient device and then to wait until the recipient device responds to some instruction included in the data. The source device sets RFR and loads TO register 58 with the address of the recipient device. As can be seen in FIG. 3, setting of the RFR signal causes setting of signal SLRDY at the next clock pulse. The source device then executes the bus request phase, the address phase and the data phase. Thereafter, the source device will not accept data from any device other than the recipient device to which the data was sent, because acceptance of data requires assertion of the input SHE at the input of AND gate 152, generation of signal SHE requiring equality of the number in TO register 58 and the number appearing on pins $SA_0$–$SA_3$ which are both connected to the input of equality tester 140 (see FIG. 5).

When the recipient device has performed whatever operation on the data it has been instructed to do, the recipient device executes the bus request phase and the address phase. During the address phase the recipient device sends the address of the source device on destination pins $D_0$–$D_3$ (see FIG. 3) so that a high state is applied to the D input of flip flop 73; DME is thereby produced during the data phase. Additionally, the number stored in the TO register 58 of the source device is the same as the address of the recipient device sent on the source address pins $SA_0$–$SA_3$ (see FIG. 5) so that a high state is applied to the D input of flip flop 141; SHE is thereby produced during the data phase. Consequently, the signal ACCEPT is produced in the input logic of the source device so that during the data phase the recipient device responds by sending the appropriate data on data which is received by the source device.

Thus it will be seen that the present invention provides a bus interface system for a multiprocessor which establishes priority among the various devices that are connected to the bus. Because the bus interface circuitry mounted on each device that is connected to the bus is substantially identical, a given device can be positioned in any connector on the bus and the particular position of the connector will dictate the rank of the device. This mode of operation can be achieved simply by positioning each device without any modification of the internal circuitry of the device. Additionally, the call back circuitry assures that data transfers, although delayed, will occur in the order in which they are initiated.

Although one embodiment of the invention has been shown and described, it will be obvious that other adaptations and modifications can be made without departing from the true spirit and scope of the invention.

What is claimed is:

1. A system for controlling access to a multiconductor common bus having $2^n$ connectors for effecting connection of a corresponding number of circuit devices to the bus, wherein n is a positive integer greater than 1, a plurality of circuit devices engaged with respective said connectors so as to establish connection between the devices and the bus, a clock pulse source for producing successive time quantums, and means for coupling said clock pulse source to said devices, the connectors each having a unique code identification and being positionally ranked on the bus from superior to inferior so that a device engaged with a given connector is positionally ranked and identified in correspondence with the given connector, said system comprising n associated pairs of priority terminals in each connector, one terminal of each said pair being a transmit terminal and the other being a receive terminal, said pairs of terminals being grouped into n groups wherein each group contains a number of terminal pairs equal to the number of said connectors and wherein each pair in a connector is a member of only one group, each group being an $i^{th}$ group wherein i has an integer value from 1 to n, the terminal pairs of each group being subsumed in one of $2^{n-i}$ sets, means interconnecting the transmit terminals of one half the pairs of each set to the receive terminals of the other half of the pairs in the set thereby to establish the devices engaged with the connector having said one half the pairs as superior devices and the devices engaged with the connectors having other half of the pairs as inferior devices with respect to the superior devices bus signal request applying means carried on each said device for applying a bus request signal to all transmit terminals in the connector with which the device is engaged during a first time quantum so that devices engaged with connectors having receive terminals interconnected with transmit terminals to which the bus request signal is applied are established as inferior devices, each said device having means for sensing the receive terminals in the connector with which the device is engaged during said first time quantum, and means on each device coupled to said sensing means for establishing one of said devices as a source device in response to sensing simultaneous absence on all receive terminals in the connector with which the device is engaged of a bus request signal from a superior device.

2. A system according to claim 1 wherein said bus has a plurality of first address conductors common to all said connectors and the devices connected thereto and wherein each said device includes addressing means responsive to the establishing means therein for applying to said first address conductors during a second time quantum succeeding said first time quantum an identification code signal identifying one of the other devices engaged with one of the connectors as a recipient device for data from said source device, said devices each having receiving means coupled to said first address conductors, each said device also having acknowledging means responsive to receipt of the identification code signal of the recipient device on said first address conductors for producing a data accept signal having a non-acknowledge state when said recipient device is unready for data reception and an acknowledge state different from said non-acknowledge state when said recipient device is ready for data reception, said acknowledging means including ready for input state producing means indicative of said recipient device being ready for data reception from any other said device engaged with one of said connectors for producing a ready for input signal, said acknowledging means also including first means responsive to coincidence of said ready for input signal and presence on said first address conductors of the identification code signal identifying said recipient device for producing said acknowledge state of said data accept signal, said bus having a plurality of data conductors common to all said connectors and the devices connected thereto, data transfer means on each said device and active when a device is a source device for transferring data to said data conductors during a third time quantum succeeding said second time quantum, said bus having a plurality of second address conductors common to all said connectors and the devices connected thereto, each said device having source identifying means active when a device is a source device for connecting to said second address conductors during said third time quantum an identification code signal identifying said source device, each said device having means active when the device is a recipient device and responsive to being in said acknowledge state for receiving data on said data conductors and the identification code signal of said source device on said device on said second conductors during said third time quantum.

3. A system according to claim 2 wherein said acknowledging means includes asserting means active subsequent to said third time quantum when a given device is a source device ans is prepared to transmit data to a preselected recipient device for selectively asserting said non-acknowledge state so as to indicate that the preselected recipient device is unready for data reception, wherein said given device includes first storing means for storing the identification code signal of the preselected recipient device applied to said first address conductors during the second time quantum, wherein said preselected recipient device includes second storing means for storing the identification code signal of the given source device applied to said second address conductors during said third time quantum, and wherein said bus includes a plurality of third address conductors common to all said connectors and the devices connected thereto, said preselected recipient device having means for applying to said third address conductors the identification code signal from said second storing means, and equality testing means in said given source device and coupled to the acknowledging means therein for causing said acknowledging means to assert the acknowledge state thereof in response to equality between the identification signal in said first storing means and the identification code signal on said third address conductors during a time quantum subsequent to said third time quantum, whereby said given source device can receive data from only said preselected recipient device at time subsequent to the third time quantum.

4. A system according to claim 3 wherein said acknowledging means produces a non-acknowledge signal representative of the non-acknowledge state of said data accept signal in response to coincidence of absence of said ready for input signal and presence on said first conductors of an identification code signal identifying a device as a recipient device, wherein said bus includes a plurality of queue conductors common to said connectors and the devices connected thereto and a non-acknowledge conductor in said bus for coupling said data accept signal to all said connectors, and wherein said recipient device has means coupled to said non-acknowledge conductor for transmitting thereover said data accept signal, each said device having queue forming means active when a device is a recipient device and including number generating means for generating one of a plurality of discrete call back number signals, incrementing means for changing the number signals generated by said number generating means to another of said plurality of call back numbers, and connecting means responsive to said non-acknowledge state of said data accept signal for connecting said call back number signals to said queue conductors and for activating said incrementing means, each said device having storing means active when the device is a source device for receiving and storing said call back number signals on said queue conductors and the non-acknowledge state of said data accept signal on said non-acknowledge conductor during said third time quantum so that said source device has a stored call back number and is established as a waiting source device, each said device having call back means active when a device is a recipient device and responsive to the non-acknowledge state of said ready for data input signal during a fourth time quantum subsequent to said third quantum for establishing said recipient device as a call back source device, said bus including a call back conductor common to all said connectors and the devices connected thereto, each said device having call back signalling means active when the device is a call back source device and responsive to said call back means for applying to said call back conductor during a fifth time quantum subsequent to said fourth time quantum a call back signal, each said device having call back sensing means coupled to said call back conductor and active when the device is a waiting source device for inhibiting the acknowledging means in said waiting source device from asserting the acknowledge state thereof during the fifth time quantum, each said device having transmitting means active when a device is a call back source device for transmitting during the fifth time quantum call back number signals generated by said number generating means to said first address conductors and the identification code signal of said recipient device to said third address conductors, said waiting source device having activating means responsive to equality of said stored call back number in said storing means and said call back number signals on said first address conductors for activating the waiting source device to transmit data to said recipient device on said data conductors during a sixth time quantum succeeding said fifth time quantum, thereby to effect reception of data by said recipient device.

5. A system according to claim 3 wherein said bus includes a bid conductor and wherein at least some of said devices engaged with said connectors are coacting devices and include means for coacting with said bid conductor to form a secondary queue for temporally controlling bus access among said coacting devices, said coacting means including means active during a time quantum immediately preceding said first time quantum for inhibiting said bus request signal applying means in response to the presence of a bid signal on said bid conductor, and means active during said first time quantum and in unison with said bus request signal applying means for applying a bid signal to said bid conductor so that the first coacting device that produces a bid signal prevents other said coacting devices from applying said bus request signal so that said first coacting device acquires access to the bus prior to all other coacting devices irrespective of the positional rank of said coacting devices.

* * * * *